(12) United States Patent
Aratani

(10) Patent No.: US 6,356,524 B2
(45) Date of Patent: Mar. 12, 2002

(54) METHOD OF RECORDING/REPRODUCING AN INFORMATION SIGNAL

(75) Inventor: Katsuhisa Aratani, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/821,235

(22) Filed: Mar. 29, 2001

Related U.S. Application Data

(62) Division of application No. 09/130,318, filed on Aug. 7, 1998, now Pat. No. 6,249,503.

(30) Foreign Application Priority Data

Aug. 8, 1997 (JP) .............................................. 9-214492

(51) Int. Cl.$^7$ .............................................. G11B 9/00
(52) U.S. Cl. ........................ 369/126; 369/128; 369/135
(58) Field of Search ............................ 369/126, 95, 99, 369/127, 128, 135, 151; 250/306, 307

(56) References Cited

U.S. PATENT DOCUMENTS 5,610,898 A * 3/1997 Takimoto et al. ........... 369/126
5,831,961 A * 11/1998 Sakai et al. .................. 309/126
5,835,477 A * 11/1998 Binnig et al. ................ 369/126

* cited by examiner

*Primary Examiner*—Paul W. Huber
(74) *Attorney, Agent, or Firm*—Sonnenschein, Nath & Rosenthal

(57) ABSTRACT

Disclosed is a method of recording/reproducing information signals at an access speed in the order of $\mu$s, a recording density of 1 to 10 GBs/cm$^2$, and a data transfer rate in the order of Gbit/sec without breakage of the data. The method includes the steps of: making a head device face to a memory medium having a flat recording surface, the head device including a plurality of head elements two-dimensionally arranged each of which has at its leading end a flat portion having an area of 0.1 $\mu$m$^2$ or less; moving the head device relative to the memory medium a distance more than a gap between two adjacent ones of the head elements; and recording an information signal at a specific position of the recording surface at a recording density of 1 Gbit/cm$^2$ or more, or reproducing an information signal previously recorded on the recording surface at a specific position by the head device.

6 Claims, 8 Drawing Sheets

INSULATION TREATMENT

MASKING

RIE

PLATING

METHOD OF RECORDING/REPRODUCING AN INFORMATION SIGNAL

RELATED APPLICATION DATA

This application is a divisional of application Ser. No. 09/130,318, filed Aug. 7, 1998, now U.S. Pat. No. 6,249,503. The present and foregoing applications claim priority to Japanese Application No. P09-214492, filed Aug. 8, 1997. All of the foregoing applications are incorporated herein by reference to the extent permitted by law.

BACKGROUND OF THE INVENTION

The present invention relates to a method of recording information signals in digital form on a memory medium at a relatively high density or reproducing (or detecting) information signals previously recorded in digital form on a memory medium at a relatively high density, and a head device and a memory medium used for the recording/reproducing method.

Various kinds of large-capacity memories are presently known, for example, a semiconductor memory represented by a DRAM or Flash memory, a magnetic tape represented by a video recorder, and a disk memory represented by a compact disk or hard disk. These memories have problems, for example, in terms of high bit cost and low access speed and may be not suitably used for future information inputting/outputting apparatuses such as a microprocessor or network requiring a more increased data transfer rate and data capacity. A related art hard disk, optical disk or magnetic tape is lower by two digits or more in cost per unit data (bit) than a semiconductor memory; however, it is significantly inferior in access time, data transfer time and volume of the disk to the semiconductor memory.

At present, with the enhanced performances of computers and the increased communication speed of information networks, the quantity of data to be processed has become larger and the processing rate of data to be processed has become high. To meet such technical development, it is desired to realize a read only memory and a writable memory with the cost per bit kept substantially comparable to that of a magnetic disk or optical disk and with the access time, data transfer time and volume of the memory increased to the levels comparable to those of a semiconductor memory.

The size of a semiconductor chip, for example, used in a DRAM has become larger with the progressing technical generations, and it is expected that the size of a semiconductor chip is to be more than about 3×3 cm at the 4 Gbit-generation. In this case, the area including a package will be about 12 cm². To be used like such a DRAM, a memory to be developed is desired to have a size smaller than the above value and a low bit cost.

The memory capacity stored in the above-described area (about 12 cm²) is preferably equivalent to a capacity, for example, which is capable of storing dynamic images for about one hour, and more specifically, the memory capacity is required to have about 12 Gbits, that is, a memory density of at least 1 Gbit/cm² in consideration of digital image signals with the compressed frequency band.

As a memory capable of meeting the above-described requirement, there have been extensively studied memories of a type using a so-called SPM (Scanning Probe Microscope) such as a STM (Scanning Tunneling Microscope) or AFM (Atomic Force Microscope).

Such a memory has been described in detail, for example, in "H. J. Mamin et al.: IBM J. Res. Develop. Vol. 39, 681 (1995)". This memory detects an information signal using a head device 100 shown in FIG. 10A. The head device 100 has a beam cantilevered with its one end fixed on a head substrate 102, which is generally called a cantilever 103, and a head element 101 as a signal detecting portion (hereinafter, referred to simply as "head element") formed at the leading end of the cantilever 103. The head element 101 is sharply pointed into the shape of a triangular or quadrangular prism by a semiconductor process. The leading end of the head element 101, sharply pointed up to the level of atomic, size is moved close to the surface of a substance to be measured (data surface in the case of the memory), and an interatomic force acting between the head element 101 and the surface of the substance or a tunneling current flowing therebetween is directly or indirectly measured, to thus obtain information therefrom.

B. D. Terris et al. have reported in "Appl. Phys. Lett. 69(27), 4262(1996)" a method of preparing a data patten applicable to a disk-like medium by an electron beam plotting apparatus, transferring the patten on an ultraviolet cured resin layer formed on a glass disk by a so-called glass 2P process to prepare a data disk, and reproducing data signals stored in the disk by an AFM.

H. J. Mamin et al. have reported in "Sensors and Actuators A48, 215(1995)" a method of bringing a leading end of an AFM in contact with a high polymer substrate, heating the leading end of the AFM by laser to melt the surface of the high polymer substrate, thereby recording data on the surface of the high polymer substrate, and reproducing the data at a reproducing rate as high as 1 Mbit/sec by the AFM.

The apparatus for recording/reproducing information signals in each of these documents carries out recording/reproducing with the disk medium rotated using one AFM head.

H. Kado et al. have reported in "Appl. Phys. Lett. 66(22), 2961(1995)" a method of forming a platinum thin film on a silicon substrate and also forming an amorphous $GeSb_2Te_4$ film thereon, carrying out recording by applying a pulsive electric field between a sharpened conductive head element and the platinum thin film, and carrying out reproducing by detecting a difference in electric conductivity as a change in current.

The above detection of data using the AFM, however, is not suitable for reproducing information signals at a high rate because the interatomic force is converted into a mechanical displacement of the cantilever 103 and the displacement is detected by a displacement meter using a piezoelectric effect or laser. Also in the case where information signals are recorded or reproduced on or from a rotating disk-like recording medium, the above detection of data using the AFM is disadvantageous in that it takes a time to wait rotation and the access speed becomes low.

To improve an effective data transfer rate, there has been known a method of carrying out parallel processing using a plurality of head devices. For example, S. C. Minne et al. have reported in "Appl. Phys. Lett. 67(26), 3918(1995)" an apparatus in which two AFM head devices with leading ends of head elements separated 100 μm from each other are arranged in parallel whereby images of a grating with a cycle of 5 μm are reproduced. In this parallel processing apparatus, ZnO having a piezoelectric effect is used for part of each cantilever to individually displace the two cantilevers in the depth direction, and the size of the cantilever becomes larger (length: 420 μm, width: 85 μm) for sufficiently ensuring the displacement, with a result that the mechanical resonance frequency becomes low to reduce the data transfer rate. Accordingly, even in the case of using a plurality of the AFM head devices, the data transfer rate is not improved so much.

The data reproducing apparatus (microscope) using a plurality of the head elements described in the above document does not report a method or mechanism of detecting or correcting a positional relationship between each head element and desired data in the direction parallel to the surface to be measured, causing a problem that the address management for data which is important for the memory apparatus cannot be performed. Even if each distance and positional relationship between two pieces of respective head elements has been clearly measured and also the positional relationship between either one of the head elements and the address of the data surface has been measured, the relationship between each head element and the data position cannot be kept resulting from a difference in thermal expansion coefficient between the head array and the substrate of the recording medium, for example, caused by temperature change.

In the memory apparatus using the SPM, since the leading end of the head element 101 of the head device 100 is very sharpened as shown in FIG. 10B and only the leading end of the head element 101 is brought in contact with the data surface, if an impact force is applied to the memory apparatus during reproducing of data, the data surface in contact with the leading end of the head element 101 may be applied with a very high local pressure, which causes a fear of destruction of data stored in the data surface. For example, S. C. Minne et al. have reported in "Sensors and Actuators A48, 215 (1955)" that a leading end of a head element is formed into a spherical shape having a curvature of 100 nm or less. A spring constant of the cantilever is in the order of 1 N/m. Now, it is assumed that a leading end of a head element applied with an impact force is displaced 10 nm on the data surface side and is brought in contact with the data surface; and the leading end of the head element is formed into a flat circular shape having a radius of 10 nm. In this case, a pressure applied to the flat circle portion is as very high as $3 \times 10^7$ N/m$^2$, which will cause destruction of data stored on the data surface of a medium, insofar as the medium is made from a usual material. Even if there is not a destruction of data, since the leading end of the head element is worn, there arises another problem that the shape of the leading end is changed and thereby the resolution in recording or reproducing is reduced.

In the above-described recording/reproducing method proposed by H. Kado, since a current value upon reproducing is 10 pA at a location where information signals have not been recorded and is 1 nA at a location where information signals have been recorded, a reproducing signal with a sufficient S/N can be obtained when the data reproducing rate is low because the frequency band of the reproducing signal is narrow; however, a reproducing signal with a sufficient S/N cannot be ensured at the above small signal current of about 1 nA when the data reproducing rate is high because the frequency band of the reproducing signal becomes wide.

SUMMARY OF THE INVENTION

An object of the present invention is to provide a method of recording/reproducing information signals on/from a ROM and a writable memory medium at an access speed in the order of $\mu$s, a recording density of 1 to 10 GBs/cm$^2$, and a data transfer rate in the order of Gbit/sec without destruction of the data.

To achieve the above object, according to the present invention, there is provided a method of recording/reproducing an information signal, including the steps of: making a head device face to a memory medium having a flat recording surface, the head device including a plurality of head elements two-dimensionally arranged each of which has at its leading end a flat portion having an area of 0.1 $\mu$m$^2$ or less; moving the head device relative to the memory medium a distance more than a gap between two adjacent ones of the head elements; and recording an information signal at a specific position of the recording surface at a recording density of 1 Gbit/cm$^2$ or more, or reproducing an information signal previously recorded on the recording surface at a specific position by the head device.

As described above, according to the method of and apparatus for recording/reproducing information signals in accordance with the present invention, there can be obtained a ROM system and a writable memory system having an access speed in the order of $\mu$s, a recording density of 1 to 10 GBs/cm$^2$, and a data transfer rate in the order of Gbit/s.

The information signal recording/reproducing apparatus of the present invention is inferior in processing rate and reliability to a semiconductor memory but is lower two digits or more in bit cost than the semiconductor memory, and therefore, it can be applied to a variety of technical fields. That is to say, the recording/reproducing apparatus of the present invention may be used in applications including a CD, MD, electronic game machine, DVD and video camera, in place of an optical disk and a magnetic disk, particularly, it may be effectively used for a portable CD player called a walkman, digital camera or may be used in place of a hard disk for a laptop type computer or the terminal of a portable computer.

The method of and apparatus for recording/reproducing information signals in accordance with the present invention are also very effectively used for applications which require processing of a large amount of data, high speed retrieval, and high speed access, for example, for a recognition data base for video recognition and image recognition and a data bank for video demand distribution.

BRIEF DESCRIPTION OF THE DRAWINGS

FIGS. 10A and 10B are conceptional views showing a related art head device, wherein FIG. 10A is a side view of the head device and FIG. 10B is a side view, with an essential portion enlarged, showing a head element of the head device.

DETAILED DESCRIPTION OF THE PREFERRED EMBODIMENTS

Hereinafter, embodiments of the present invention will be described with reference to the accompanying drawings.

Referring first to FIGS. 1 to 4, there will be described various head elements of the present invention.

Figure 1:
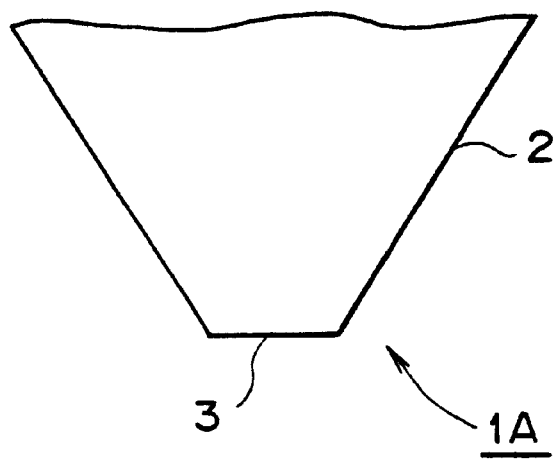
FIG. 1 is a side view, with an essential portion enlarged, showing the shape of a leading end of a head element as a first embodiment of the present invention.
Figure 2:
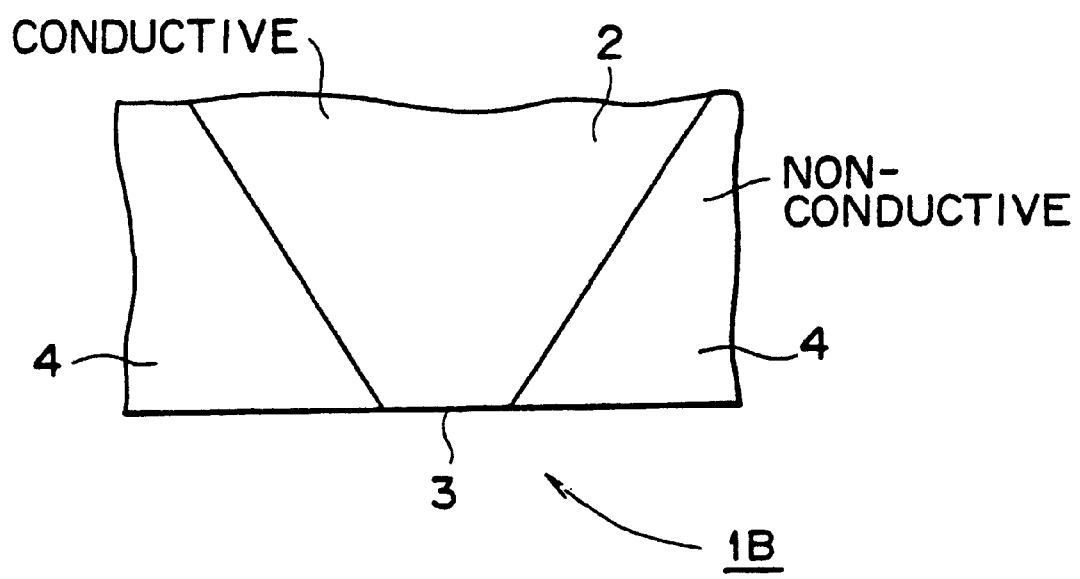
FIG. 2 is a side view, with an essential portion enlarged, showing the shape of a leading end of a head element as a second embodiment of the present invention.
Figure 3:
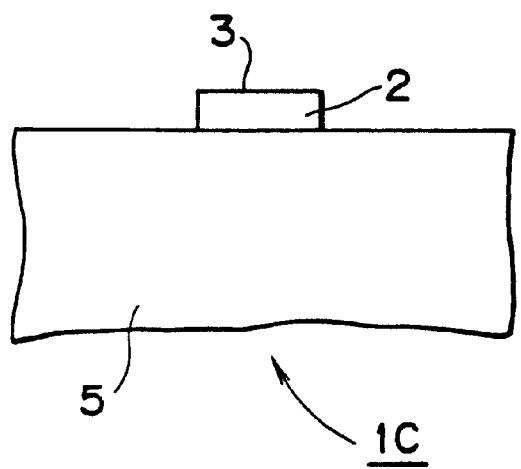
FIG. 3 is a side view, with an essential portion enlarged, showing the shape of a leading end of a head element as a third embodiment of the present invention.
Figure 4:
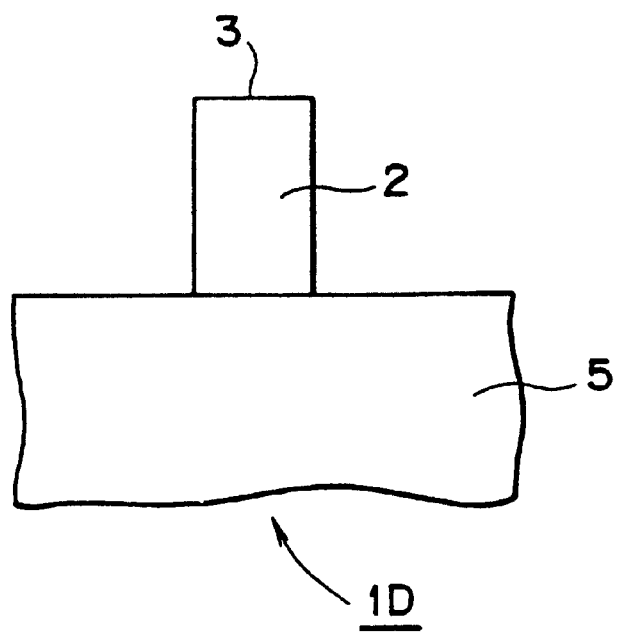
FIG. 4 is a side view, with an essential portion enlarged, showing the shape of a leading end of a head element as a fourth embodiment of the present invention.

FIG. 1 is a side view, with an essential portion enlarged, showing the shape of a leading end of a head element as a first embodiment of the present invention; FIG. 2 is a side view, with an essential portion enlarged, showing the shape of a leading end of a head element as a second embodiment of the present invention; FIG. 3 is a side view, with an essential portion enlarged, showing the shape of a head element as a third embodiment of the present invention; and FIG. 4 is a side view, with an essential portion enlarged, showing the shape of a leading end of a head element as a fourth embodiment of the present invention.

First, the head element as the first embodiment of the present invention will be described with reference to FIG. 1.

Figure 10A:
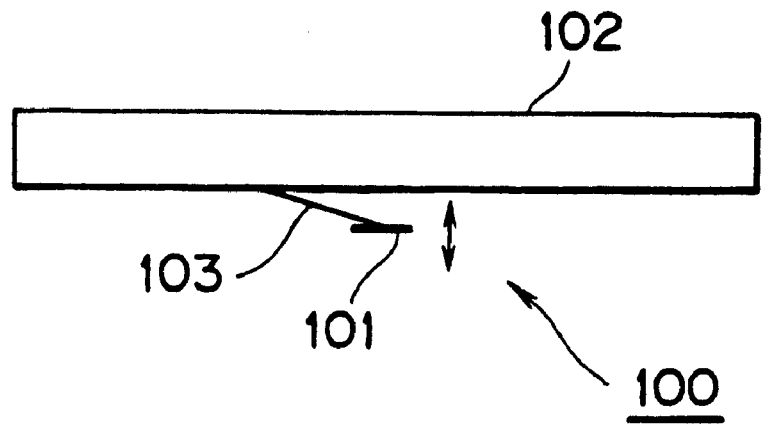
Figure 10B:
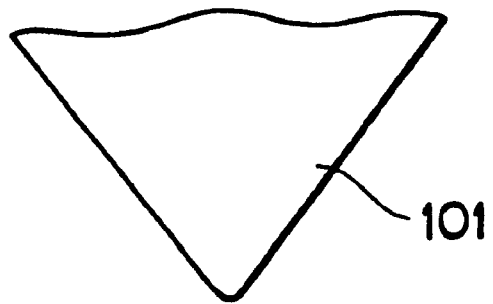

As described above, the leading end of the related art head element, shown in FIG. 10B, is pointed sharply enough to allow detection of a change at the atomic size level, and is regarded as a semi-spherical shape having a very small curvature in an enlarged view, so that when the leading end of the related art head element is brought in contact with a memory medium, the contact point of the memory medium is locally applied with a very high pressure, causing a fear of destruction of data stored on the memory medium. The head element shown in FIG. 1 is intended to solve such a disadvantage.

In FIG. 1, reference numeral 1A indicates the head element of the present invention. To reduce a pressure applied to a memory medium at the time of the above collision, a leading end 2 of the head element 1A as an information signal detecting portion or an information signal detecting electrode is flattened as indicated by reference numeral 3. Taking it into account to detect an information signal recorded at a density of 1 Gbit/cm$^2$ or more, the size of the leading end of the head element 1A is required to be in a range of 0.1 $\mu$m$^2$ or less.

The larger the area of the flat portion 3 becomes, the more the force generated at the collision with a memory medium is dispersed. As a result, the probability of destruction of data is reduced. For example, in the case where the cell size of data to be reproduced (detected) is 0.1×0.1 $\mu$m and it is judged whether the data is "1" or "0" on the basis of the presence or absence of a recess of the cell size, the spacial resolution upon reproducing may be set at a value in the order of the cell size. Assuming that the resolution is set at a value being a half of the cell size, that is, 0.05×0.05 $\mu$m, the size of the flat portion 3 of the leading end 2 of the head element 1A may be set at a value in the same order, that is, 0.05×0.05 $\mu$m. The contact area of the flat portion 3 is a square having one side of 0.05 $\mu$m, although the contact area of the leading end of the related art head element is a circle having a radius of 10 nm. That is, the area ratio therebetween becomes 8, and thereby the impact pressure applied to the flat portion 3 upon collision is reduced to one-eighth of the impact pressure applied to the leading end of the related art head element upon collision. It is to be noted that the wording "flat" means not only a perfect flat state but also a surface somewhat coarsened or a shape having a curvature similar to or smoother than that of the data cell size.

Although only the flattening of the leading end of the head element exhibits an effect of reducing the impact upon collision, the structure of a head element 1B as the second embodiment shown in FIG. 2 is more effective, in which a peripheral portion 4 of a conductive leading end 2 is made from a non-conductive material, whereby the contact area with a memory medium upon collision is extended without substantially extending the area of a flat portion 3 of the leading end 2 as the information signal recording portion or detecting portion.

The leading end of the head element may be formed into a shape different from a prism or needle as in the related art AFM. Concretely, as shown in FIG. 3, a head element 1C as the third embodiment of the present invention is configured such that a thin film as a leading end 2 is formed on the surface of a substrate 5 made from a non-conductive material, whereby the flatness of the leading end 2 can be more easily ensured.

The shape of the leading end 2 of each of the head element IC shown in FIG. 3 and the head element 1B shown in FIG. 2 is advantageous as follows: namely, in the case of reproducing a memory medium on which information signals are recorded (stored) in the form of irregularities, the leading end 2 is prevented from being erroneously bitten in each recess of the irregularities of the memory medium because the flat portion 3 of the leading end 2 can be wider than the area of the recess. This is effective to essentially prevent an error of a reproducing signal or mechanical breakage of the data surface caused by erroneous biting of the leading end 2 in the recess.

A head element 1D as the fourth embodiment of the present invention shown in FIG. 4 is configured such that a leading end 2 having a columnar structure is formed on the surface of a substrate 5. With this structure, even if the edge of the leading end 2 is worn, the size of the leading end 2 is not changed, whereby the spacial resolution in recording or reproducing is not reduced.

In the case where the area of the flat portion of the leading end of each head element is enlarged to make wider the contact area with a memory medium as described above, there is a possibility that the data surface of the memory medium is degraded by friction and wear. To protect the data surface of the memory medium or the leading end 2 of the head element, either or both of them are preferably formed with a conductive material having a small friction coefficient and a large hardness. For example, either or both of them may be covered with a film made from carbon or carbon hydride (diamond like carbon) by a sputtering or CVD process. It is effective that such a film is further thinly coated with a lubricant made from a high polymer material. The high polymer lubricant preferably has a conductivity; however, even if the high polymer lubricant is insulating, it allows reproducing using ac current insofar as it has a thin film thickness.

A method of increasing a data transfer rate upon reproducing data will be described below.

For reproducing a large-capacity of data instantly, it is required to increase a data transfer rate as well as an access speed.

To increase a data transfer rate, it is important to ensure a sufficient S/N even in a wide frequency band, and to adopt a reproducing method which is essentially not limited to the data transfer rate, for example, a reproducing method limited to the resonance frequency of the apparatus. In the case of the AFM or STM, the spacial resolution is very high; however, the output is dependent on a very weak force or current such as an interatomic force or tunneling current, so that it is difficult to obtain a large reproducing signal and hence to obtain a sufficient S/N in a wide frequency band.

In view of the foregoing, according to the present invention, there is adopted a method of reproducing information signals in which the data "1" or "2" is made to correspond to switching of a current and reproducing is performed by turn-on/turn-off of the current.

Figure 5:
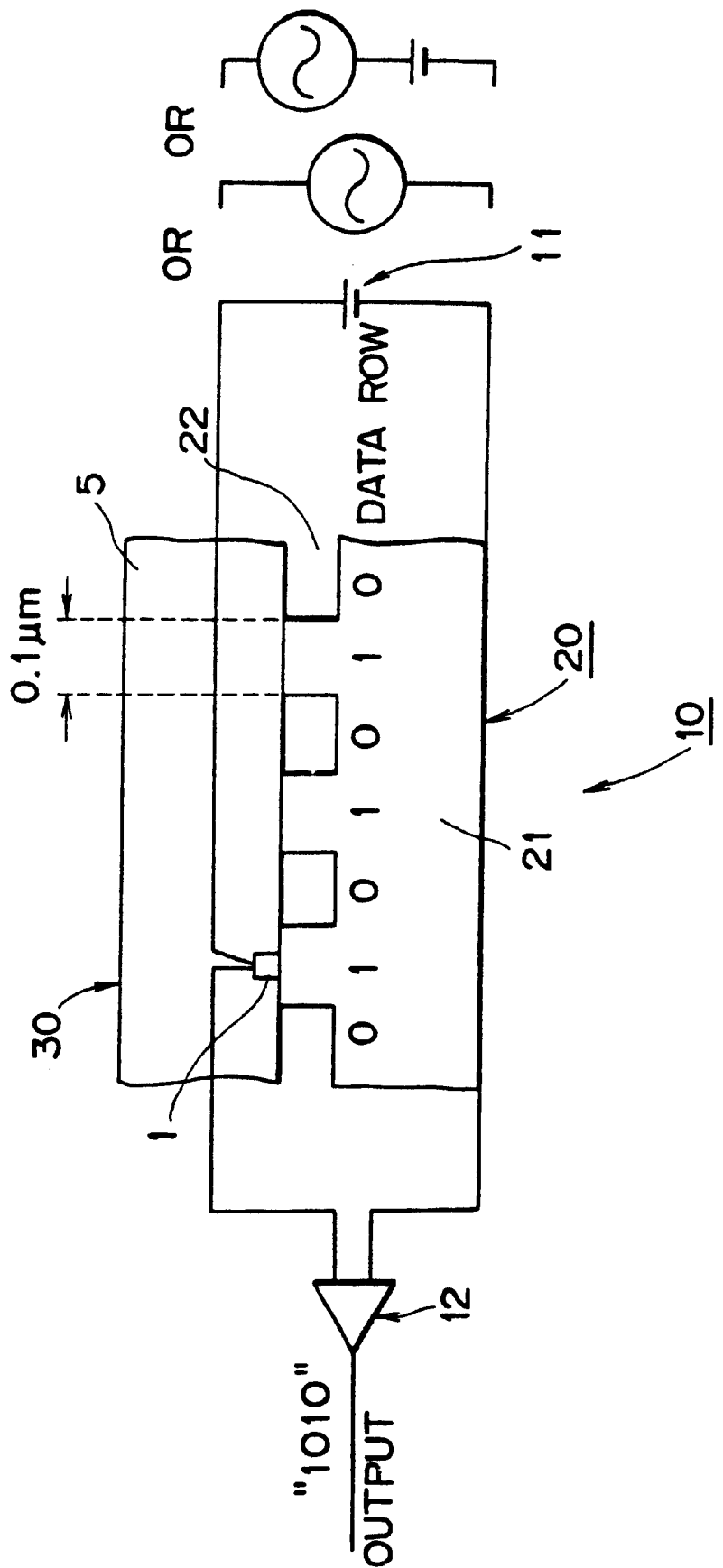
FIG. 5 is a conceptional view illustrating a method of recording/reproducing information signals according to the present invention.
Figure 6:
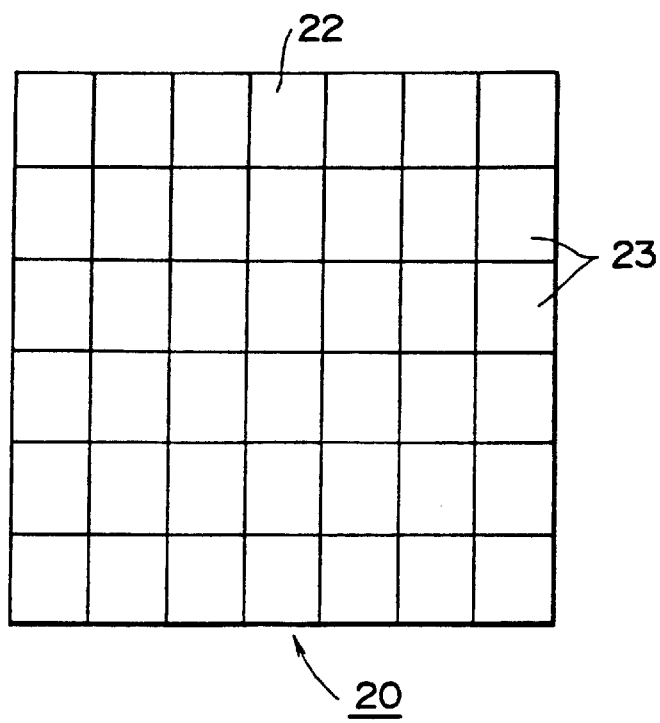
FIG. 6 is a conceptional plan view of a memory medium suitably used for the method of recording/reproducing information signals according to the present invention.

FIG. 5 is a conceptional view of an information signal recording/reproducing apparatus as an embodiment for illustrating the method of recording/reproducing information signals according to the present invention; FIG. 6 is a conceptional plan view of a memory medium suitably used for the method of recording/reproducing information signals according to the present invention; and FIG. 7 is a conceptional plan view of a head device suitably used for the method of recording/reproducing information signals according to the present invention.

In FIG. 5, reference numeral 10 indicates an information signal recording/reproducing apparatus as the embodiment of the present invention. The recording/reproducing apparatus 10 includes a memory medium 20 shown in FIG. 6, a head device 30 shown in FIG. 7, a power supply 11, and an amplifier 12.

It is to be noted that in the specification the wording "recording/reproducing apparatus" means not only an apparatus having both the "recording and reproducing" functions but also an apparatus having only the "recording" function or the "reproducing" function.

Figure 7:
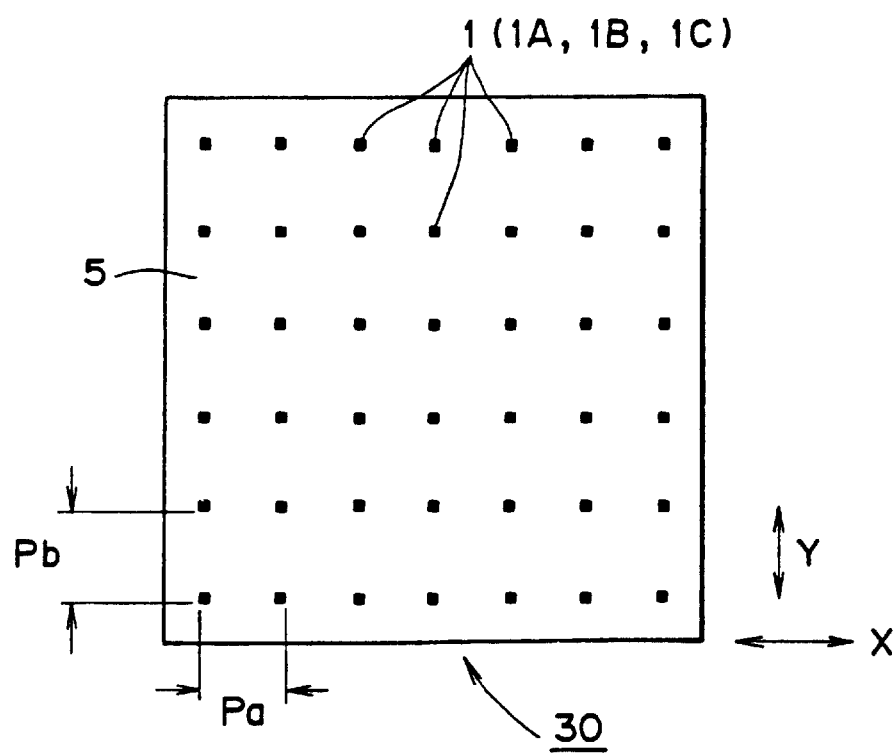
FIG. 7 is a conceptional plan view of a head device suitably used for the method of recording/reproducing information signals according to the present invention.

The memory medium 20 of the present invention has a structure shown in FIGS. 5 and 7 in which a conductive layer 22 is formed on a quadrilateral shaped flat conductive substrate 21. The recording surface of the conductive layer 22 is, as shown in FIG. 6, sectioned into a plurality of sectors 23 arranged, for example, in a cross-cut pattern. One sector 23 is a unit data area which allows reproducing by a specific one head element 1. On each sector 23 are recorded information signals in the form of irregularities.

The head device 30 is so configured as shown in FIGS. 5 and 7 in which a number of head elements 1 (of a type selected from the head elements 1A, 1B and 1C) are arranged, on a substrate 5, in a specific two-dimensional pattern, for example, in such a matrix pattern that the head elements 1 correspond to the sectors 23 of the memory medium 20 on a one-for-one basis in the X-direction and the Y-direction with the distance (pitch) between at least the adjacent heads on the X-direction set at a value of Pa and with the head pitch in the Y-direction set at a value of Pb. That is to say, one head element 1 operates in one sector 23 as a recording region or reproducing region.

The method of reproducing information signals according to the present invention using the recording/reproducing apparatus 10 of the present invention will be described below.

FIG. 5 shows a principle of reproducing information signals previously recorded in the form of irregularities on each sector 23 of the memory medium 20 in a state in which the head device 30 is brought in contact with the memory medium 20. Referring to FIG. 5, an electric field is applied between the conductive substrate 21 of the memory medium 20 and the head element 1 by the power supply 11. While not shown, a mechanism is provided for suitably bringing the head element 1 in contact with the memory medium 20, and only when the head element 1 is brought in contact with the projection of the irregularities of the memory medium 20, a current is allowed to flow from the head element 1 to the memory medium 20. Such a current is current-voltage converted and amplified by the amplifier 12 into a large signal voltage.

In the case where the contact area of the head element 1 in contact with the memory medium 20 is 0.05×0.05 $\mu$m, assuming that the current density is 5×108 A/m$^2$, a current of 1.4 $\mu$A flows only when the head element 1 is brought in contact with the projection of the memory medium 20, and assuming that the resistance upon current-voltage conversion is 500 ohms, the current of 1.4 $\mu$A is current-voltage converted into a voltage of 70 $\mu$V. Accordingly, a sufficient S/N can be obtained even for a reproducing signal frequency band of 10 MHz.

In the case of using the resistance of 500 ohms upon current-voltage conversion, a thermal noise of the resistance becomes predominant as the noise in the ideal case. Assuming that the signal frequency band is 10 MHz and the temperature is 300 K, the thermal noise current is calculated into a value of 57 nA. The signal current of at least 200 nA, preferably, 570 nA is required for reproducing a digital signal in a state not being obstructed by the noise current. In the case of reproducing information signals at the above current density of 5×10$^8$ A/m$^2$, the contact area of the head element 1 in contact with the memory medium 20 becomes at least 0.0004 $\mu$m, preferably, 0.0011 $\mu$m$^2$, and accordingly, if the contact portion of the head element 1 has a square shape, the size of the contact portion becomes at least 0.02×0.02 $\mu$m, preferably, 0.033×0.033 $\mu$m.

In the embodiment shown in FIG. 5, a dc electric field is applied to the head element 1; however, an ac electric field may be applied thereto. In the case where an extremely thin insulating layer is formed on the head element 1 or on the reproduced surface of the memory medium 20 or in the case where a space such as an extremely thin air layer is formed between the head element 1 and the reproduced surface of the memory medium 20, it is preferred to apply an ac electric field having a high frequency.

In the case of using a focus mechanism for bringing the head device 30 in contact with the memory medium 20 using an electrostatic force, there is a fear of interference between the electric field required for signal detection and the electric field required for the focus mechanism. To avoid such an inconvenience, it is preferred to use, for signal detection, an ac electric field having a frequency very higher than the resonance frequency of a movable portion of the head device 30.

In the above-described document "H. Kado et al.: Appl. Phys. Lett. 66(22), 2961(1995)", information signals are reproduced from the writable memory medium made from amorphous GeSb$_2$Te$_4$ by making use of a change in electric conductivity between states before and after recording. In this technique, since the reproducing signal current is as weak as 1 nA, it is difficult to carry out reproducing at a high rate. The reason why the reproducing signal current is weak is that if the reproducing current is large, the conductivity of the non-recorded portion of the memory medium 20 will be changed, that is, the recording will be performed, and consequently the reproducing current cannot be set at a large value. To make large the reproducing current, it is required to make large a current value to start recording on the non-recorded portion. To meet such a requirement, it is effective to change the composition of the material, film thickness, or the shape of the head element.

As described in the above embodiment, for the read only memory medium 20, the possibility of recording is very small and thereby the upper limit of the reproducing current can be increased. For a writable type memory medium, control of the current to start recording differs depending on the recording mechanism. In general, the recording mechanism is classified into a type in which recording is performed by heat generated due to flow of a current, a type in which recording is performed by an electric field locally increased, and a type in which recording is performed by a pressure generated upon collision between a head element (probe) and a memory medium. In each type of the recording mechanism, the sharper the leading end of the head element (probe), the smaller the current to start recording. Accordingly, it is difficult to obtain a large reproducing current. From this viewpoint, the leading end of the head element (probe) is desired to a flat structure which allows a reproducing signal current of 10 nA or more.

For carrying out rapid access, it is desired to make the movable portion as small and light as possible and also to make the moving distance as short as possible. A disk medium utilizing apparatus such as a hard disk apparatus or optical disk apparatus generally mounts one head per one recording surface and moves the disk medium in the radial direction thereof by a swing arm or linear actuator. It may be considered that a number of magnetic heads or optical heads are arranged in the radial direction to reduce the moving distance per one head, thereby improving the access speed to the desired radial position; however, this method has disadvantages that the magnetic head or optical head is high in cost per one head and also the volume is large and thereby the size of the memory apparatus is increased. Actually, the method of improving the access speed by arranging a number of magnetic heads or optical heads has been not adopted.

On the contrary, since the head device 30 of the present invention is extremely small and a plurality of the head elements can be easily manufactured (as will be described later), the head device 30 can be configured to have a multi-head as shown in FIG. 5. The head device 30 of the present invention can be also configured such that a plurality of heads are arranged in the radial direction of a rotating memory medium such as a disk, whereby the heads can be accessed to all of the information signals recorded on the memory medium by moving each head at least a distance more than a pitch between the adjacent heads in the radial direction of the memory medium.

In the above configuration, assuming that the head pitch is 1 mm, the heads can be instantly accessed to desired tracks only by moving them a distance of 1 mm.

Even in the case of adopting such a configuration, however, for a rotating type disk medium, it takes a time to wait rotation. To cope with such an inconvenience, it may be considered to rotate the disk medium at a high speed; however, this method has a problem in terms of stability and reliability of a spindle motor.

According to the present invention, as shown in FIGS. 5 to 7, the access speed is improved by bringing the head device 30 having a plurality of the head elements 1 arranged in a matrix pattern in contact with the recording surface of the memory medium 20, and moving the head device 30 relative to the memory medium 20 a pitch P of the head element 1.

The head device 30 can be moved in the X and Y directions by moving a movable stage on which the head device 30 is mounted, for example, using a stepping motor, DC motor, or piezoelectric actuator.

In the case where the pitch P between the head elements 1 is 2 mm, that is, in the case where the arrangement density of the head elements 1 of the head device 30 is 25 head elements/$cm^2$, a movement distance to a data position is about 1 mm. In this case, assuming that an average driving speed of the actuator is 1 m/s, the access speed becomes 1 ms which is faster several times than the related art one. If the pitch P between the head elements is made shorter, for example, to 0.2 mm, the access speed can be made fast to 100 $\mu$s.

As described above, in the case of reproducing information signals recorded on the memory medium 20 using the head device 30 including a plurality of the head elements 1, data stored on a plurality of the sectors 23 of the memory medium 20 can be simultaneously reproduced by the plurality of the head element 1. For a long information signal, it is undesirable to continuously reproduce it by one head element 1. Such a long information signal may be first divided into parts and recorded on a plurality of different ones of the sectors 23 on the memory medium 20. In this case, the long information signal can be reproduced for a short time by simultaneously scanning a plurality of ones of the head elements 1 corresponding to the plurality of ones of the sectors 23 on which the parts of the long information signal are recorded.

In addition to the reproducing rate, the head device 30 has another advantage. When an information signal is divided into parts and recorded on a plurality of ones of the sectors 23 as described above, even if a part of the information signal stored on a certain sector 23 is broken or a certain head element 1 is broken down, it is possible to eliminate such a fear that all of the parts of the information signal cannot be reproduced, and to carry out reproducing with no error using suitable error collection. As a result, it is effective to divide an information signal into parts and record the parts on different ones of the sectors 23.

A plurality of recording/reproducing apparatuses 10 may be prepared by changing the combination of the head device 30 and the memory medium 20 for each recording/reproducing apparatus, wherein an information signal in the same information signal series is dispersedly recorded on or reproduced from different ones of the plurality of different recording/reproducing apparatuses 10, to thereby improve the reliability or improve the effective data transfer rate.

The addressing method using the above recording/reproducing apparatus 10 will be described below.

To reproduce a desired information signal, it is necessary to confirm at what position the desired information signal is recorded on the memory medium 20 and access the head device 30 to the position, and more specific, it is necessary to confirm positional information of the desired information signal and move the head element 1 to the position (in the in-plane direction and the depth direction). Here, the positional adjustment in the in-plane direction (X, Y direction) is called "positioning" and the positional adjustment in the depth direction is called "focusing" for the sake of convenience.

To make each head element 1 of the head device 30 face to the corresponding sector 23 of the memory medium 20 and carry out positioning of the head element 1 to the sector 23 upon recording or reproducing, it is desired to move the entire head device 30 or move the memory medium 20 with the head device 30 fixed. For carrying out the positioning, each head element 1 must be moved in the in-plane direction a distance of about the pitch P between the head elements 1. For example, in the case where the pitch P between the head elements 1 is 0.1×0.1 mm, each head element 1 can be moved a distance of 0.1 mm or more. In the case of independently positioning the head elements 1, there must be provided actuators each capable of moving each head element 1 a distance of 0.1 mm or more. That is to say, each mechanism movable the pitch P between the two adjacent head elements 1 must be formed within a gap between the two adjacent head elements 1. This is difficult to be realized. On the contrary, there is no problem in the case of moving the entire head device 30 a distance of about 0.1 mm.

The movement of the entire head device 30, however, is disadvantageous in carrying out fine positioning between each head element 1 and the position of a desired information signal. This is because the movement of the entire head device 30 makes it impossible to correct an error of the pitch P between the head elements 1 caused at steps of manufacturing the head device 30, an error of the interval between information signals caused at steps of manufacturing the memory medium 20, or an error of positioning caused by a difference in thermal expansion coefficient between the memory medium 20 and the head device 30 depending on a change in service environment, for example, temperature and moisture.

To carry out the error correction (hereinafter, referred to as "fine positioning"), it is effective to provide an actuator capable of moving each head element 1 a micro-distance. In the case of the above positioning, the head element 1 is moved a distance of 0.1 mm; however, in the case of fine positioning, the head element 1 is sufficient to be moved a distance of one-tenth or less of the pitch P between the head elements 1. Accordingly, fine positioning can be sufficiently achieved using a small-sized actuator using a piezoelectric element.

In this way, the head device 30 of the present invention is controlled in two steps: the positioning (course positioning) step for moving the entire head device 30 and the fine positioning step for finely moving each head element 1.

In addition to the above two-step control, there is a more simplified recording/reproducing method in which only the course positioning is performed and the fine positioning is not performed. In this method, after each head element 1 is substantially moved by course positioning to a position where reproducing or recording is to be performed, information signals on the periphery of the position are collectively reproduced or recorded; and in the case of reproducing, the information signals thus obtained are stored in a buffer memory and then data at the desired position is specified by signal processing. For example, in the case of reproducing information signals along a line called a track on which the information signals are recorded, the reproducing is performed without tracking control. In this case, by reproducing information signals at a cycle being twice or more of at least a cycle (pitch) of the track, the desired information signal can be restored by the subsequent signal processing. In the case where information signals are two-dimensionally recorded, information signals may be reproduced at a cycle being twice of a cycle in each of the X-direction and the Y-direction. Here, the size of the leading end of the head element 1 may be set at a large value to make high the spacial resolution and make large a signal current, and more specifically, the length of the head element 1 is desired to be in a range of one-tenth to one-half of the pitch of the above track.

The information signals are preferably stored in the buffer memory as digital signals discontinuous with time for ease of the subsequent signal processing. The sampling cycle for taking signals in the buffer memory is desired to be a length equivalent of the cell size or one bit of the information signal or a time being a half or less that required for movement of the head device by course positioning.

If both the memory medium 20 and the head device 30 are very excellent in terms of smoothness and flatness, focusing may be omitted; however, actually, it is difficult to keep constant the flatness of each of the memory medium 20 and the head device 30 by the effect of deformation due to temperature and moisture or warping due to the film stress. Assuming that the size of the memory medium 20 is 2×2 mm² and the angle of warping is 2°, the heights in the depth direction at both the ends of the memory medium 20 are different 70 µm from each other. Like the above-described positioning case, it is difficult to provide actuator's functions capable of moving the head elements the above distance for each head element. Accordingly, even in this case, a two-step control is effective like the above positioning case.

To achieve rough focusing, it is desirably simple to flatten both the head device 30 and the memory medium 20. For this purpose, a substrate of each of the head device 30 and the memory medium 20 may be formed of a thick plate made from a material having a large elastic modulus; or the substrate of the head device 30 may be formed of a thick plate made from a less deformable material having a larger elastic modulus while the substrate of the memory medium 20 may be formed of a thin plate made from a deformable material having a small elastic modulus. Upon recording/reproducing, the above memory medium 20 is brought in close-contact with the flat stage or the head device 30 is pushed on the memory medium 20 to thus obtain a desired flatness.

As the less deformable material having a large elastic modulus, there may be used a ceramic material such as glass, or a metal such as silicon, aluminum, or stainless steel. As the deformable material, there may be used a high polymer such as acrylic resin, polycarbonate, or nylon.

It is effective to bring the memory medium 20 in close-contact with the stage or the head device 30 using an electrostatic force.

To achieve fine focusing, it is desired to mount actuator mechanisms movable about 10 µm or less in the depth direction independently on respective head elements 1. The actuator mechanism is represented by an electrostatic element or piezoelectric element. Whether or not the head element 1 is in contact with the memory medium 20 is judged by monitoring an impedance in a reproducing signal line or recording circuit. Accordingly, the contact of the head element 1 with the memory medium 2 can be stably feedback controlled using the signal thus monitored. The fine focusing mechanism may be provided per one head element 1 as described above, or may be provided per one of a plurality of adjacent head elements 1.

In addition to an information signal, an address signal for giving a relative position of the memory medium 20 to the head element 1 or the head device 30 is recorded on the memory medium 20. To be more specific, the address signal, which is for giving two-dimensional positional information in the sector 23, may be previously recorded on the memory medium 20 in the form of irregularities, or may be recorded on the memory medium 20 by the head device 30 upon recording.

A method of manufacturing the memory medium 20 will be described below.

The read only memory medium 20 is preferably configured such that fine irregularities formed on the substrate surface are used as signals. Like a compact disk, an original plate on which a pattern of fine irregularities is formed by photolithography or using an electron beam plotting apparatus is prepared, and a substrate with the pattern of fine irregularities is formed by injection-molding or extrusion-molding using the original plate as a die, to obtain a memory medium.

Alternatively, a substrate coated with an ultraviolet cured resin is separately prepared, and a pattern of fine irregularities is formed on the resin layer using a so-called 2P (Photo Polymerization) process.

The substrate may be made from glass or metal as well as a high polymer such as acrylic resin or polycarbonate.

The writable memory medium 20 is prepared by preparing a flat substrate with no irregularities or a substrate on part of which irregularities as an address signal are formed by the above-described method, and forming, on the substrate, a material allowing an impedance between the head element 1 and the memory medium 20 to be locally changed before and after local application of an electric field, current, heat, or pressure.

As such a material, there may be used amorphous $GeSb_2T_4$ described in the above-described document, a high polymer dissolved or deformed by heat or pressure, a capacitor for storing electric charges, or a ferroelectric material.

The head element 1 or the head device 30 can be formed on a flat substrate made from glass or the like by a semiconductor process. The movable portion for fine focusing is formed of a membrane supported on the substrate by means of a cantilever beam or a double-end fixed beam using a micromachinning process. In addition, ICs such as a focus-servo controller, head amplifier, and current driver may be integratedly mounted in the substrate of the head device 30.

An embodiment of a method of manufacturing the head device 30 will be described with reference to FIGS. 8A to 8H and FIGS. 9A to 9D.

FIGS. 8A to 8H are process diagrams illustrating a method of manufacturing the head device as the first embodiment of the present invention; and FIGS. 9A to 9D are process diagrams illustrating a method of manufacturing the head device as the second embodiment of the present invention.

Figure 8A:
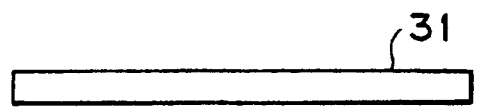
FIGS. 8A to 8H are process diagrams illustrating a method of manufacturing the head device as the first embodiment of the present invention.

First, at the step shown in FIG. 8A, there is prepared a substrate 31 (equivalent to the substrate 5 of the head device 30) formed of a silicon wafer containing an impurity at a relatively high concentration (that is, having a conductivity). The substrate 31 may be already formed with a signal processing circuit or current driver.

Figure 8B:
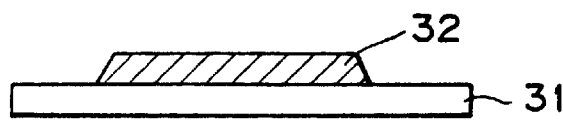

A so-called sacrifice layer having a trapezoidal cross section is, at the step shown in FIG. 8B, patterned on-the surface of the substrate 31 by a micromachinning process. The sacrifice layer will be removed later by etching. The material for forming the sacrifice layer is suitably selected from a photoresist, aluminum and $SiO_2$ in consideration of the combination with other materials which will be formed in the subsequent steps. Here, a photoresist is patterned by exposure and development. Reference numeral 32 indicates the photoresist pattern.

Figure 8C:
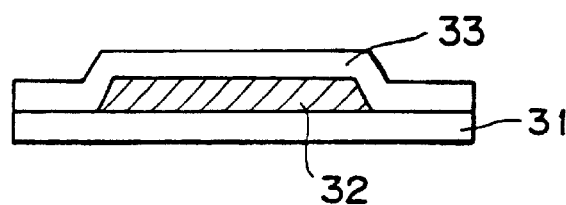

Then, at the step shown in FIG. 8C, a film 33 made from an aluminum alloy is formed to a thickness of one to several $\mu$m. The film 33 will be formed into a vertically movable spring member functioning as a fine focusing mechanism.

Figure 8D:
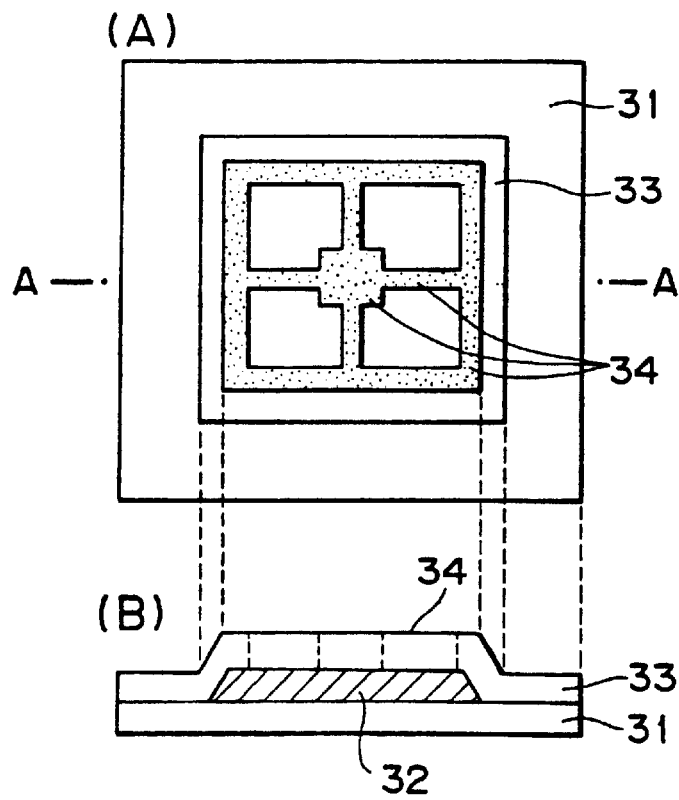

The aluminum alloy film 33 is patterned into a pattern 34 at the step shown in FIG. 8D. The pattern 34 has a plurality of central portions functioning as a plurality of springs, positioned over an approximately central portion of the trapezoidal photoresist pattern 32, and a peripheral portion-fixed on the periphery of the substrate 31. In addition, FIG. 8D-(B) is a sectional view taken on line A—A of FIG. 8D-(A).

Figure 8E:
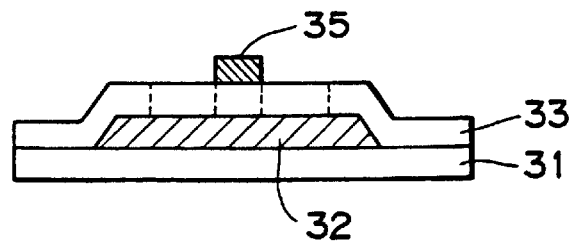

The process goes on to the step shown in FIG. 8E at which a fine square patten of a photoresist 35, having one side less than the thickness of the aluminum alloy film 33, is-formed at a central portion of the aluminum alloy film 33 positioned over an approximately center of the trapezoidal photoresist pattern 32.

Figure 8F:
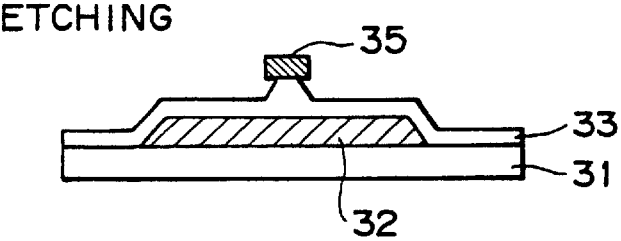

The aluminum alloy film 33 is isotropically etched using phosphoric acid at the step shown in FIG. 8F. At this time, the etching is completed before the square photoresist 35 is perfectly separated from the aluminum alloy film 33 so that the leading end of the aluminum alloy film 33 remains as a flat portion.

Figure 8G:
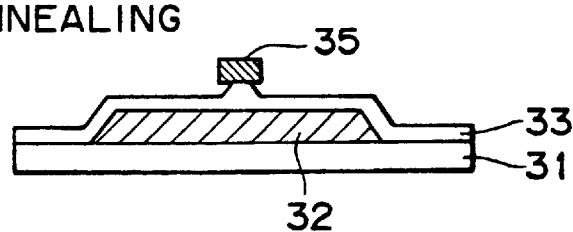
Figure 8H:
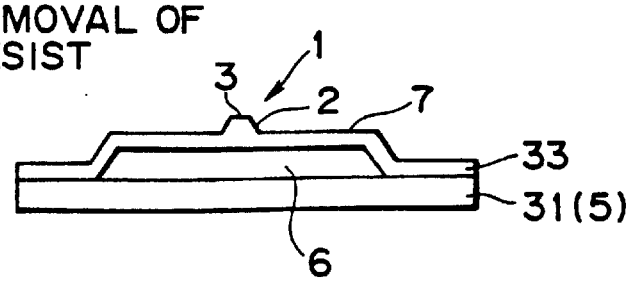

The substrate 31 is annealed in a gas atmosphere containing oxygen at the step shown in FIG. 8G. With this annealing, the stress caused in the aluminum alloy film 33 can be relieved, and the surface of the aluminum alloy film 33 except for the leading end (which is in contact with the micro-photoresist 35) for forming a head element is oxidized to be converted into the insulating surface.

After annealing, the trapezoidal photoresist 32 and the micro-photoresist 35 are removed by a resist releasing agent at the step shown in FIG. 8B. As a result, a cavity 6 is formed between the aluminum alloy film 33 and the substrate 31 (equivalent to the substrate 5 shown in FIGS. 3 and 4); a portion of the trapezoidal aluminum alloy film 33 over the cavity 6 forms a spring 7; and a head element 1 including a leading end 2 having a flat shape 3 is formed at a central portion of the spring 7. It is to be noted that the head element thus formed is indicated by the same reference numeral 1 as that of the head element shown in FIGS. 3 and 4.

Finally, the silicon substrate 31 is provided with an electrode, followed by application of a DC bias voltage, and amorphous carbon hydride is selectively formed on the flat portion made from the aluminum alloy having a conductive surface by CVD (Chemical Vapor Deposition) process, to obtain the head element 1.

Although only one head element is shown in FIGS. 8A to 8H used for description of this embodiment, a number of head elements can be simultaneously formed on the substrate 31 and also a number of head devices 30 can be simultaneously manufactured in accordance with the manufacturing process of this embodiment.

The method of manufacturing the head device as the second embodiment of the present invention will be described with reference to FIGS. 9A to 9D. In this manufacturing method, the columnar head element 1D shown in FIG. 4 is manufactured.

Figure 9A:
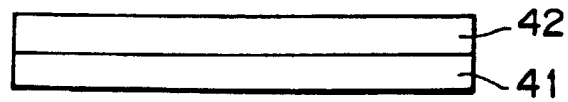
FIGS. 9A to 9D are process diagrams illustrating a method of manufacturing the head device as the second embodiment of the present invention.

First, at the step shown in FIG. 9A, a thick insulating film 42 having a thickness of about 1 $\mu$m is formed on the surface of a substrate 41 which has a conductivity at least on its surface. The insulating film 42 may be made from silicon oxide, silicon nitride, photoresist, or polyimide.

Figure 9B:
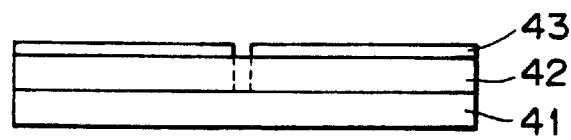

At the step shown in FIG. 9B, a mask 43 made from a material withstanding etching for the insulating film 42 is formed on the insulating film 42 except for a portion equivalent to the columnar leading end of the head element 1D. In addition, the mask 43 is preferably formed by X-ray lithography using synchrotron radiation or photolithography using ultraviolet rays having a short wavelength such as a ArF excimer laser.

Figure 9C:
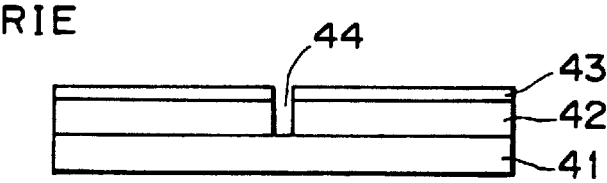

Then, at the step shown in FIG. 9C, a portion of the insulating film 42 equivalent to the leading end of the head element 1D is anisotropically removed by RIE (Reactive Ion Etching), to form a leading end forming portion 44.

Figure 9D:
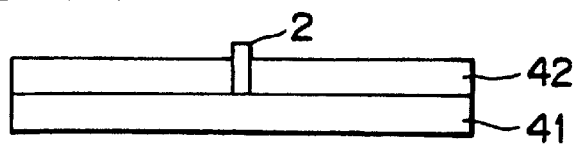

After removal of the mask 43, at the step shown in FIG. 9D, a metal such as nickel is formed in the leading end forming portion 44 by plating using the conductive substrate 41 as an electrode, to form a leading end 2. The surface of the leading end 2 thus formed is finished by polishing to improve the flatness thereof.

In this way, the head element 1D including the columnar leading end 2 shown in FIG. 4 is obtained.

Although only one head element is shown in FIGS. 9A to 9D used for description of this embodiment, like the previous embodiment, a number of head elements can be simultaneously formed on the substrate 41 and also a number of head devices 30 can be simultaneously manufactured in accordance with the manufacturing process of this embodiment.

While the preferred embodiments of the present invention have been described using specific terms, such description is for illustrative purposes only, and it is to be understood that many changes and variations may be made without departing from the scope or spirit of the following claims.

What is claimed is:

1. A method of recording/reproducing an information signal, comprising the steps of:

making a head device face to a memory medium having a flat recording surface, said head device including a plurality of head elements two-dimensionally arranged each of which has at its leading end a flat portion having an area of 0.1 $\mu m^2$ or less;

moving said head device relative to said memory medium a distance more than a gap between two adjacent ones of said head elements;

and recording an information signal at a specific position of said recording surface at a recording density of 1 Gbit/cm$^2$ or more, or reproducing an information signal previously recorded on said recording surface at a specific position by said head device.

2. A method of recording/reproducing an information signal according to claim 1, wherein an information signal is recorded on the recording surface of said memory medium in the form of irregularities or an information signal recorded on the recording surface of said memory medium in the form of irregularities is reproduced.

3. A method of recording/reproducing an information signal according to claim 2, wherein the information signal recorded on the recording surface in the form of irregularities is reproduced by applying an electric field between said head element and the recording surface of said memory medium, and detecting an impedance between said head element and said memory medium, said impedance being changed due to said irregularities corresponding to the information signal.

4. A method of recording/reproducing an information signal according to claim 3, wherein the information signal recorded on the recording surface in the form of irregularities is reproduced by detecting an impedance between said head element and the recording surface of said memory medium while bringing the leading end of said head element not in contact with the recesses of the irregularities but in contact with the projections of the irregularities.

5. A method of recording/reproducing an information signal according to claim 1, wherein the information signal is reproduced by applying an electric field having a frequency higher than a mechanical primary resonance frequency of a driving portion of said head device between the leading end of said head element and the recording surface of said memory medium, and detecting a current modulated depending on the information signal.

6. A method of recording/reproducing an information signal according to claim 1, wherein an information signal is recorded or reproduced by moving said head device relative to said memory medium in a state in which part of said head elements of said head device face to the recording surface of said memory medium.

* * * * *

UNITED STATES PATENT AND TRADEMARK OFFICE
CERTIFICATE OF CORRECTION

PATENT NO. : 6,356,524 B2 Page 1 of 1
DATED : March 12, 2002
INVENTOR(S) : Aratami, Katsuhisa It is certified that error appears in the above-identified patent and that said Letters Patent is hereby corrected as shown below:

<u>Column 4,</u>
Line 31, replace "...player called a walkman..." with -- WALKMAN (Registered Trademark of Sony Corporation) branded player --.

Signed and Sealed this

Sixth Day of June, 2006

JON W. DUDAS
*Director of the United States Patent and Trademark Office*